United States Patent
Bloom et al.

(10) Patent No.: US 10,452,446 B1
(45) Date of Patent: Oct. 22, 2019

(54) HIGH INTEGRITY MULTI-CORE PROCESSING

(71) Applicant: Rockwell Collins, Inc., Cedar Rapids, IA (US)

(72) Inventors: Nicholas H. Bloom, Marion, IA (US); Eric N. Anderson, Cedar Rapids, IA (US); Matthew P. Corbett, Mount Vernon, IA (US); Timothy R. Fannin, Urbana, IA (US); Jason R. Owen, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 237 days.

(21) Appl. No.: 15/616,520

(22) Filed: Jun. 7, 2017

(51) Int. Cl.
*G06F 9/46* (2006.01)
*G06F 9/50* (2006.01)
*G06F 9/52* (2006.01)
*G06F 9/455* (2018.01)

(52) U.S. Cl.
CPC ........ *G06F 9/5027* (2013.01); *G06F 9/45558* (2013.01); *G06F 9/52* (2013.01); *G06F 2009/45591* (2013.01)

(58) Field of Classification Search
None
See application file for complete search history.

(56) References Cited

U.S. PATENT DOCUMENTS

| | | | |
|---|---|---|---|
| 8,301,867 B1 * | 10/2012 | Mazuk | G06F 11/1625 398/66 |
| 9,137,038 B1 * | 9/2015 | Mazuk | G06F 11/14 |
| 2007/0220517 A1 * | 9/2007 | Lippett | G06F 1/3203 718/102 |
| 2014/0082331 A1 * | 3/2014 | Smith, II | G06F 9/4887 712/220 |
| 2014/0082340 A1 * | 3/2014 | Smith, II | G06F 11/1683 712/241 |
| 2014/0208165 A1 * | 7/2014 | Kang | G06F 11/2242 714/37 |
| 2016/0062810 A1 * | 3/2016 | Von Wendorff | G06F 11/079 714/38.1 |
| 2017/0060579 A1 * | 3/2017 | Vincent | G06F 9/3836 |
| 2017/0286827 A1 * | 10/2017 | Chen | G06N 3/049 |
| 2018/0105183 A1 * | 4/2018 | Kollmer | B60W 50/0205 |
| 2019/0042796 A1 * | 2/2019 | Von Bokern | G06F 21/64 |

* cited by examiner

*Primary Examiner* — Kenneth Tang
(74) *Attorney, Agent, or Firm* — Suiter Swantz pc llo

(57) ABSTRACT

Transparently executing applications among cores in a multi-processor system includes monitoring elements associated with each processor which align execution of threads within corresponding cores of the processors. Alignment is accomplished by monitoring system resource utilization by each core, comparing process counters associated with corresponding cores, and comparing data sets in and out during application frame switching. In a further aspect, inputs are coordinated by a synchronization element. Likewise, outputs for corresponding cores are compared to ensure no corrupted data is propagated.

20 Claims, 3 Drawing Sheets

HIGH INTEGRITY MULTI-CORE PROCESSING

BACKGROUND

Avionics systems require high integrity processing. State of the art avionics systems are designed to provide high integrity processing that is transparent to software applications. Current methodologies for achieving a high integrity, transparent processing platform require two discrete host processors executing the same software simultaneously in a lockstep fashion. The executing software is not aware of the integrity architecture implemented by the hardware. The transactions generated by the software are exposed by the processors and are validated by external comparison logic.

Future devices will be based on performance driven multi-core system-on-a-chip (SoC) architecture that does not directly support transparent lockstep execution. Such devices do not expose the low level busses needed to design a fully transparent high integrity processing architecture using the hardware lockstep approach. The synchronization of asynchronous hardware events within and between multi-core SoCs (such as internal clock domain crossings, divergent branch predictions, multi-core interference channel latency jitter, out-of-order execution, or unexpected machine state interrupts) presents a challenge for integrity architectures.

Additional complexities arise in a multi-core SoC environment when trying to synchronize the scheduling of multiple threads executing across local or remote processing cores with sufficient determinism to show that output comparison monitoring provides integrity coverage without generating a high rate of false comparison errors.

Consequently, it would be advantageous if an apparatus existed that is suitable for implementing transparent high-integrity processing in a multi-core SoC environment.

SUMMARY

In one aspect, embodiments of the inventive concepts disclosed herein are directed to a system and method for transparently executing applications among cores in a multi-processor system. Hypervisors associated with each processor, or a dedicated monitoring element, align execution of threads within corresponding cores of the processors. Alignment is accomplished by monitoring system resource utilization by each core, comparing process counters associated with corresponding cores, and comparing data sets in and out during application frame switching.

In a further aspect, inputs are coordinated by a synchronization element. Likewise, outputs for corresponding cores are compared to ensure no corrupted data is propagated.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
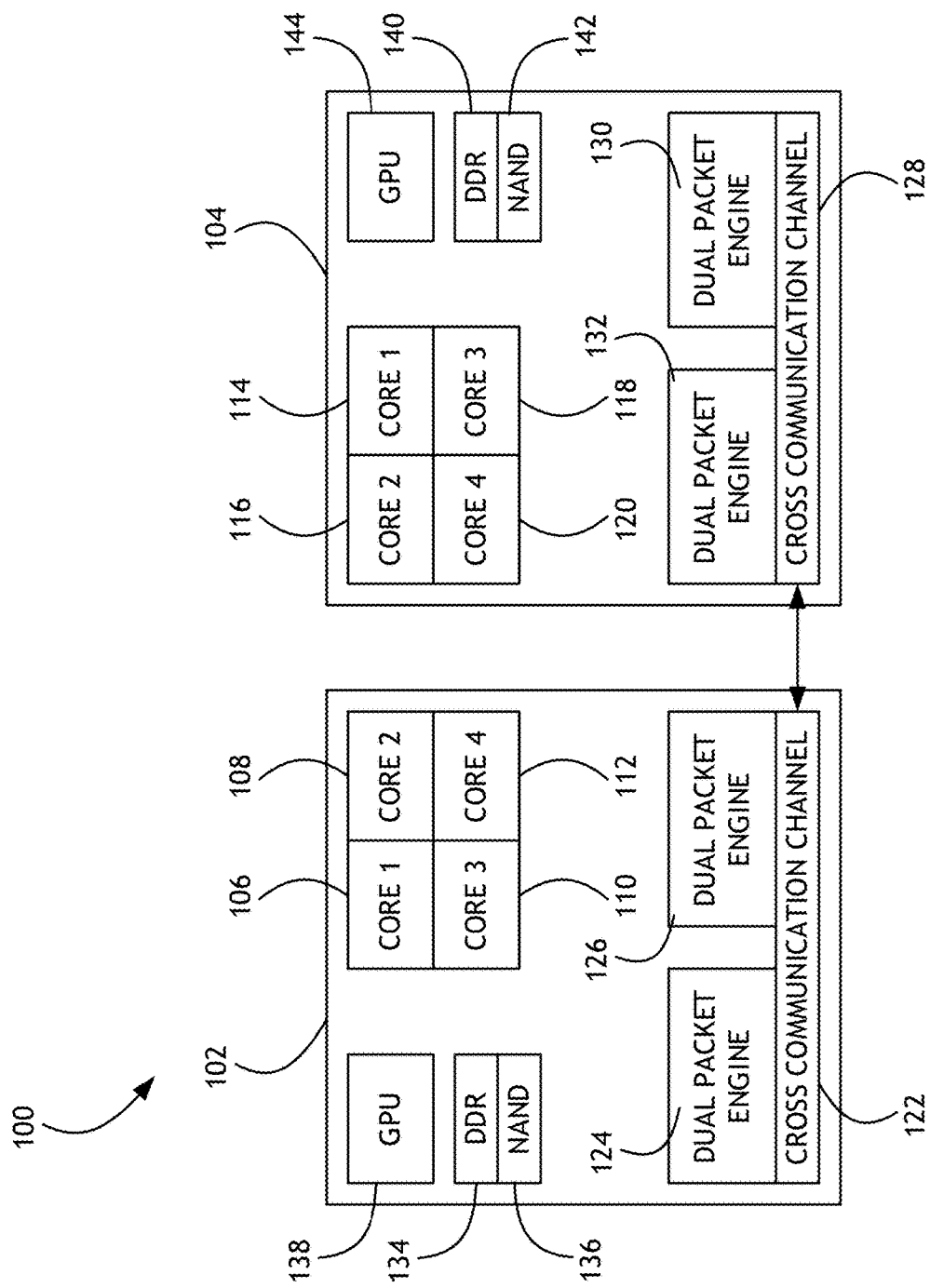
FIG. 1 shows a block diagram of an exemplary embodiment of a system for implementing the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and method for transparently executing applications among cores in a multi-processor system by monitoring resource allocation and temporarily halting executing on one or more cores in a processor.

Referring to FIG. 1, a block diagram of an exemplary embodiment of a system 100 for implementing the inventive concepts disclosed herein is shown. The system 100 includes at least two processors 102, 104; the processors 102, 104 may comprise SoCs. Each processor 102, 104 comprises two or more cores 106, 108, 110, 112, 114, 116, 118, 120. For some embodiments, the cores 106, 108, 110, 112, 114, 116, 118, 120 are dual-lock step processors or verified processors.

During application startup, two or more cores 106, 108, 110, 112, 114, 116, 118, 120 from each of the processors 102, 104 are dedicated to the application.

High integrity execution requires alignment of input, alignment of execution, and verification of output. In at least one embodiment, input is received by one or more dual packet engines 124, 126, 130, 132 in each processor 102, 104 via a corresponding cross communication channel 122, 128. The cross communication channels 122, 128 of the processors 102, 104 are in data communication with each other. Inputs are pushed to the dual packet engines 124, 126, 130, 132 such that inputs to the cores 106, 108, 110, 112, 114, 116, 118, 120 are synchronized.

In at least one embodiment, a hypervisor or monitoring element may monitor access to system resources such as memory 134, 136, 140, 142, or auxiliary processing device 138, 144. In one embodiment, the hypervisor or monitoring element identifies core 106, 108, 110, 112, 114, 116, 118, 120 access to system resources 134, 136, 140, 142, 138, 144, and thereby monitors phases of execution of an application executing on the cores 106, 108, 110, 112, 114, 116, 118, 120. For example, where the hypervisor or monitoring element identifies that a first thread executing on a first core 106 and a second thread executing on a second core 108 of a first processor 102 access memory 134, 136 in a particular order, and that a first thread executing on a first core 114 and a second thread executing on a second core 116 of a second processor 104 access memory 140, 142 in a substantially similar order, the hypervisor or monitoring element may determine that application processing is aligned. Some percentage threshold of disparity may be defined as an acceptable limit.

Furthermore, the hypervisor or monitoring element may utilize system resource 134, 136, 140, 142, 138, 144 access patterns to identify application threads that potentially should be aligned.

In at least one embodiment, a hypervisor or monitoring element monitors context switching within cores 106, 108, 110, 112, 114, 116, 118, 120 via a guest operating systems capability to initiate such switching. For example, the hypervisor or monitoring element identifies when a first core 102 of a first processor 102 switches from a first thread to a second thread. When the guest operating system switches the first core 102 from the first thread to the second thread, a data set associated with the first thread is stored and a data set associated with the second thread is accessed. In the context of high integrity processing, a corresponding first core 114 of a second processor 104 also switches from a first thread to a second thread and therefore also switches data sets. Each stored data set associated with the first thread stored by both the first processor 102 and second processor 104 are compared, as are the retrieved data sets. By comparing data sets as they are stored and accessed, the hypervisor or monitoring element may insure that execution is aligned.

In at least one embodiment, a hypervisor or monitoring element instantiates a process execution counter associated with each core 106, 108, 110, 112, 114, 116, 118, 120 involved with an application execution frame. Each process step executed by a core 106, 108, 110, 112, 114, 116, 118, 120 within the application execution frame increments the process execution counter by one; before the application frame is terminated, the hypervisor or monitoring element verifies that all process execution counters associated with a high integrity application executing on the processors 102, 104 are equal. For example, at the start of an application execution frame, a counter associated with a first core 106 within the first processor 102 and a counter associated with a first core 114 within the second processor 104 are instantiated and set to zero. Every time the first core 106 within the first processor 102 performs a process step, a first counter is incremented. Likewise, every time the first core 114 within the second processor 104 performs a process step, a second counter is incremented. At the end of the application frame, a hypervisor or monitoring element compares the first counter to the second counter; if the first counter equals 1000 and the second counter equals 1003, the hypervisor or monitoring element instructs the first processor 102 and second processor 104 to continue executing until both counters equal 1005 before the application frame is allowed to terminate. Identical execution of the application on both processors 102, 104 is thereby assured.

A person skilled in the art may appreciate that although exemplary embodiments have been illustrated with reference to two processors 102, 104 and in some cases one or two cores 106, 108, 110, 112, 114, 116, 118, 120 within each processor 102, 104, in actual implementation, any number of processors 102, 104 or cores 106, 108, 110, 112, 114, 116, 118, 120 may be involved.

In at least one embodiment, after execution of an application frame is complete and execution alignment has been verified according to the methodologies described herein, the output of the application frame from each processor 102, 104 is compared to verify that all outputs are identical so that no corrupted data is propagated.

Figure 2:
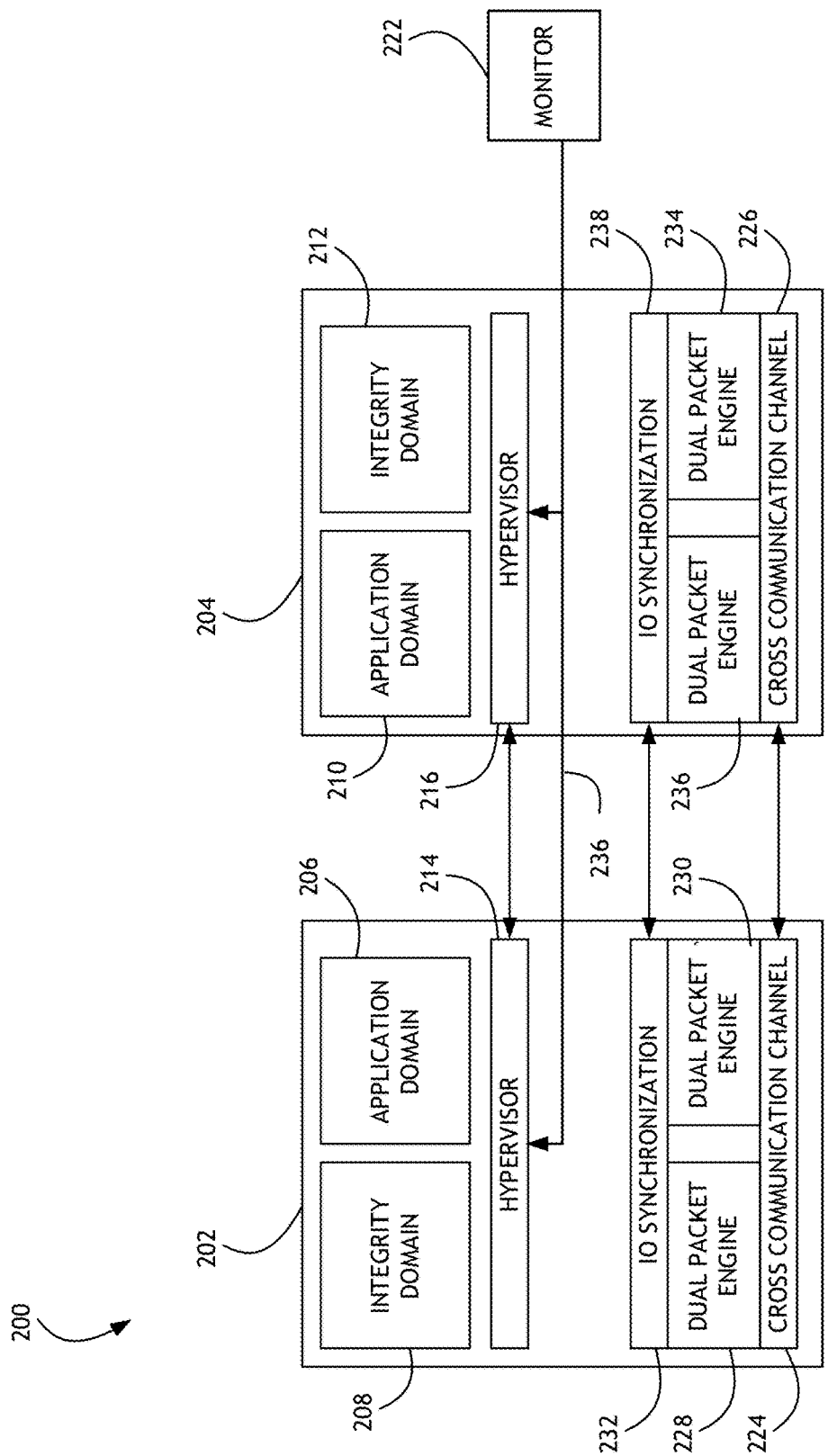
FIG. 2 shows a block diagram of an exemplary embodiment of a system for implementing the inventive concepts disclosed herein.

Referring to FIG. 2, a block diagram of an exemplary embodiment of a system 200 for implementing the inventive concepts disclosed herein is shown. The system 200 includes at least two processors 202, 204; the processors 202, 204 may comprise SoCs. Each processor 202, 204 comprises two or more cores operating in either a general application domain 206, 210 or a high integrity domain 208, 212. For some embodiments, the cores internal to processors 202, 204 are dual-lock step processors or verified processors.

During a high integrity application startup, at least one core from each of the processors 202, 204 is dedicated to the application and placed into a high integrity domain 208.

High integrity execution requires alignment of input, alignment of execution, and verification of output. In at least one embodiment, input is received by one or more dual packet engines 228, 230, 234, 236 in each processor 202, 204 via a corresponding cross communication channel 224, 226. The cross communication channels 224, 226 of the processors 202, 204 are in data communication with each other. Inputs are pushed to the dual packet engines 228, 230, 234, 236 which make the input available to corresponding IO synchronization elements 232, 234. The IO synchronization elements 232, 234 are in data communication with each other; they are configured to compare input data from the corresponding dual packet engines 228, 230, 234, 236 and coordinate timing of each data push from the dual packet engines 228, 230, 234, 236 to the corresponding processors 202, 204.

In at least one embodiment, a hypervisor 214, 216 within the corresponding processor 202, 204 monitors or manages system resources to applications or cores within at least the integrity domain 208, 212. The hypervisors 214, 216 are in data communication to compare system resource allocations to determine if applications and/or specific cores within the integrity domains 208, 212 are aligned.

In some embodiments, the system 200 may include a dedicated monitoring element 222, external to each of the processors 202, 204. The dedicated monitoring element 222 is in data communication with each hypervisors 214, 216 via a bus 236 to compare system resource allocations to determine if applications and/or specific cores within the integrity domains 208, 212 are aligned.

Furthermore, the hypervisors 214, 216 or dedicated monitoring element 222 may analyze system resource access patterns to identify application threads that potentially should be aligned.

In at least one embodiment, the hypervisors 214, 216 or dedicated monitoring element 222, or some combination, monitor context switching within cores in the integrity domains 208, 210 via a guest operating system capable of initiating such switching. For example, the hypervisors 214, 216 or dedicated monitoring element 222 identifies when a core in the integrity domain 208 of a first processor 202 switches from a first thread to a second thread. The hypervisors 214, 216 or dedicated monitoring element 222 may halt execution on that core, either directly or via instruction to the corresponding hypervisors 214, and await a context switch from a first thread to a second thread in a core in the integrity domain 212 of a second processor 204. At that time, stored data sets associated with the first thread stored by both the first processor 202 and second processor 204 are compared, as are the retrieved data sets associated with the second thread. By comparing data sets as they are stored and accessed, the hypervisors 214, 216 or dedicated monitoring element 222 may insure that execution is aligned. Aligned cores may resume execution.

In at least one embodiment, the hypervisors 214, 216 or dedicated monitoring element 222 instantiates a process execution counter associated with each core in the integrity domains 208, 212 involved with an application execution frame. Each process step executed by a core within the application execution frame increments the process execution counter by one; before the application frame is terminated, the hypervisors 214, 216 or dedicated monitoring element 222 verifies that all process execution counter associated with a high integrity application executing on the processors 202, 204 are equal. For example, at the start of an application execution frame, a counter associated with a first core within the first processor 202 and a counter associated with a first core within the second processor 204 are instantiated and set to zero. Every time the first core within the first processor 202 performs a process step, a first counter is incremented. Likewise, every time the first core within the second processor 204 performs a process step, a second counter is incremented. At the end of the application frame, the hypervisors 214, 216 or dedicated monitoring element 222 compares the first counter to the second counter; if the first counter equals 1000 and the second counter equals 1003, the hypervisors 214, 216 or dedicated monitoring element 222 instructs the first processor 202 and second processor 204 to continue executing until both counters equal 1005 before the application frame is allowed to terminate. Identical execution of the application on both processors 202, 204 is thereby assured.

A person skilled in the art may appreciate that although exemplary embodiments have been illustrated with reference to two processors 202, 204, in actual implementation, any number of processors 202, 204 may be utilized.

In at least one embodiment, after execution of an application frame is complete and execution alignment has been verified according to the methodologies described herein, the output of the application frame from each processor 202, 204 is compared by the dedicated monitoring element 222 to verify that all outputs are identical so that no corrupted data is propagated.

Figure 3:
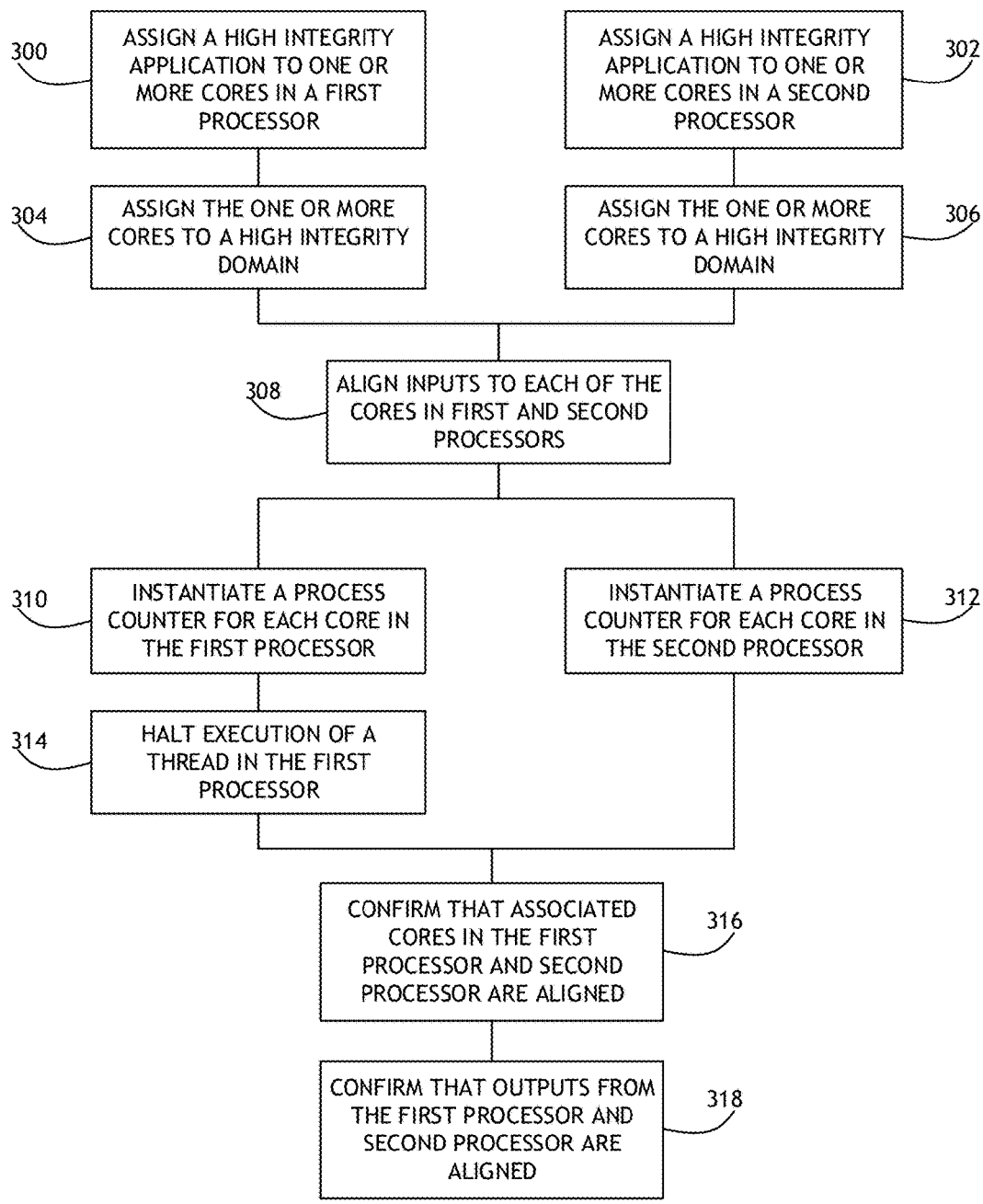
FIG. 3 shows a flowchart of a method for transparently executing applications in a multi-processor environment with high integrity.

Referring to FIG. 3, a flowchart of a method for transparently executing applications in a multi-processor environment with high integrity is shown. During application startup, cores in a first processor and a second processor are assigned 300, 302 to the application. In some embodiments, the cores are also assigned 304, 306 to a high integrity domain as distinct from an ordinary application domain such that processors may be utilized for both high integrity applications and low integrity applications.

Inputs to each high integrity core are aligned 308 by dual packet engines connected to each other via a cross communication channel. In at least one embodiment, the inputs are further aligned 308 via an IO synchronization element configured to coordinate inputs pushed to the corresponding processors.

In at least one embodiment, during processing, a process counter is instantiated 310, 312 for each core assigned to the application. Each process step causes the corresponding counter to be incremented. In at least one embodiment, execution of a thread in one core may be halted 314 when a disparity in corresponding counters is identified. Alternatively, when a disparity exists at the time an application frame attempts to terminate, corresponding cores are instructed to continue execution until their associated counters reach an identical value.

In some embodiments, alignment of cores in the first processor and second processor is confirmed 316 by comparing the process counters. Alternatively, or in addition, hypervisors or a dedicated monitoring element compare system resource utilization by each core to determine if corresponding cores access system resources in a substantially similar order, and in some embodiments, within a time frame defined by an alignment threshold.

When processing is complete, outputs from each processor are compared 318 to ensure identical output, thereby preventing propagation of erroneous data.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A high integrity computer apparatus comprising:
a first processor comprising two or more processor cores, the first processor configured to:
instantiate a first hypervisor;
define a high integrity domain;
assign at least one of the two or more processor cores to a high integrity application within the high integrity domain; and
identify system resources accessed by the at least one processor core via the first hypervisor; and
a second processor in data communication with the first processor comprising two or more processor cores, the second processor configured to:
instantiate a second hypervisor;
assign at least one of the two or more processor cores to the high integrity application in the high integrity domain; and
identify system resources accessed by the at least one processor core via the second hypervisor; and
a monitor element external to the first processor and second processor, the monitor element in data communication with the first hypervisor and second hypervisor,
wherein:
the first processor and second processor are configured to compare an order of system resources accessed by the at least one of the two or more processor cores in the first processor with an order of system resources accessed by the at least one of the two or more processor cores in the second processor while ignoring resources accessed by the first processor and second processor outside the high integrity domain; and
determine that the order of system resources accessed in the first processor and the order of system resources accessed in the second processor is within a defined threshold for identifying the first processor and second processor as aligned with respect to the high integrity application.

2. The high integrity computer apparatus of claim 1, wherein each of the first processor and second processor is further configured to instantiate a monitoring element, each monitoring element configured to perform the step of comparing the order of system resources accessed in the first processor with the order of system resources accessed in the second processor.

3. The high integrity computer apparatus of claim 2, wherein each monitoring element is configured to:
detect application frame switching within the at least one core of the associated processor; and
compare a stored data set associated with an application frame stored by the at least one core of the first processor to a stored data set associated with an application frame stored by the at least one core of the second processor.

4. The high integrity computer apparatus of claim 1, wherein each of the first processor and second processor further comprises a cross communication channel configured to align inputs to the first processor and second processor.

5. The high integrity computer apparatus of claim 4, wherein each of the first processor and second processor further comprises an IO synchronization element configured to synchronize input pushes from the associated cross communication channel to the associated first processor or second processor.

6. The high integrity computer apparatus of claim 1, wherein each of the first processor and second processor is further configured to:
compare an output from the first processor to an output from the second processor;
determine that the output from the first processor is not identical to the output from the second processor; and
report an erroneous output.

7. The high integrity computer apparatus of claim 1, wherein each of the first processor and second processor is further configured to:
instantiate a process counter associated with each of the at least one processor cores;
increment each process counter according to execution steps performed by the associated processor core;
determine that process counters of corresponding processor cores are not identical; and
force execution of corresponding processor cores until process counters are identical.

8. A method comprising:
instantiate a first hypervisor in a first processor;
assigning at least one of two or more processor cores in the first processor to a high integrity application within a high integrity domain;
instantiate a second hypervisor in a second processor;
assigning at least one of two or more processor cores in the second processor to the high integrity application within the high integrity domain;
identifying system resources associated with the first processor, accessed by the at least one processor core of the first processor via the first hypervisor;
identifying system resources associated with the second processor, accessed by the at least one processor core of the second processor;
comparing an order of system resources accessed in the first processor with an order of system resources accessed in the second processor via the second hypervisor; and
determining that the order of system resources accessed by the at least one of the two or more processor cores in the first processor and the order of system resources accessed by the at least one of the two or more processor cores in the second processor is within a defined threshold for identifying the first processor and second processor as aligned with respect to the high integrity application while ignoring resources accessed by the first processor and second processor outside the high integrity domain.

9. The method of claim 8, further comprising:
instantiating a first monitoring element associated with the first processor, the first monitoring element configured to perform the step of comparing the order of system resources accessed in the first processor with the order of system resources accessed in the second processor.

10. The method of claim 8, further comprising:
instantiating a first monitoring element associated with the first processor;
instantiating a second monitoring element associated with the second processor;
detecting application frame switching within the at least one core of the first processor with the first monitoring element;
detecting application frame switching within the at least one core of the second processor with the second monitoring element; and comparing a stored data set associated with an application frame stored by the at least one core of the first processor to a stored data set associated with an application frame stored by the at least one core of the second processor.

11. The method of claim 8, further comprising aligning inputs to the first processor and second processor via a cross communication channel.

12. The method of claim 11, further comprising synchronizing input pushes to each of the first processor and second processor from the associated cross communication channel.

13. The method of claim 8, further comprising:
instantiating a process counter associated with each of the at least one processor cores;
incrementing each process counter according to execution steps performed by the associated processor core;
determining that process counters of corresponding processor cores are not identical; and
forcing execution of corresponding processor cores until process counters are identical.

14. An avionics system comprising:
a first processor comprising two or more processor cores, the first processor configured to:
instantiate a first hypervisor;
define a high integrity domain;
assign at least one of the two or more processor cores to a high integrity application within the high integrity domain;
instantiate a process counter associated with each of the at least one processor cores via the first hypervisor; and
increment each process counter according to execution steps performed by the associated processor core;
a second processor in data communication with the first processor comprising two or more processor cores, the second processor configured to:
instantiate a second hypervisor;
assign at least one of the two or more processor cores to the high integrity application within the high integrity domain; and
instantiate a process counter associated with each of the at least one processor cores via the second hypervisor; and
increment each process counter according to execution steps performed by the associated processor core; and
a dedicated monitoring element in data communication with each of the first hypervisor and second hypervisor configured to:
determine that process counters of corresponding processor cores are not identical; and
force execution of corresponding processor cores until process counters are identical.

15. The avionics system of claim 14, wherein each of the first processor and second processor is further configured to instantiate a monitoring element, each monitoring element configured to perform the step of comparing the order of system resources accessed in the first processor with the order of system resources accessed in the second processor.

16. The avionics system of claim 15, wherein each monitoring element is configured to:
detect application frame switching within the at least one core of the associated processor; and
compare a stored data set associated with an application frame stored by the at least one core of the first processor to a stored data set associated with an application frame stored by the at least one core of the second processor.

17. The avionics system of claim 14, wherein each of the first processor and second processor further comprises a cross communication channel configured to align inputs to the first processor and second processor.

18. The avionics system of claim 17, wherein each of the first processor and second processor further comprises an IO synchronization element configured to synchronize input pushes from the associated cross communication channel to the associated first processor or second processor.

19. The avionics system of claim 14, wherein dedicated monitoring element is further configured to:
compare an output from the first processor to an output from the second processor;
determine that the output from the first processor is not identical to the output from the second processor; and
report an erroneous output.

20. The avionics system of claim 14, wherein the dedicated monitoring element is further configured to:
identify system resources accessed by the at least one processor core;
compare an order of system resources accessed in the first processor with an order of system resources accessed in the second processor; and
determine that the order of system resources accessed in the first processor and the order of system resources accessed in the second processor is within a defined threshold for identifying the first processor and second processor as aligned with respect to the high integrity application.

* * * * *